United States Patent [19]

Williams

[11] B 3,913,701

[45] Oct. 21, 1975

[54] VEHICLE INSTRUMENT PANEL COVER ASSEMBLY

[75] Inventor: Lary Lynn Williams, Dubuque, Iowa

[73] Assignee: Deere & Company, Moline, Ill.

[22] Filed: Aug. 10, 1973

[21] Appl. No.: 387,331

[44] Published under the Trial Voluntary Protest Program on January 28, 1975 as document no. B 387,331.

[52] U.S. Cl. .............................................. 180/90
[51] Int. Cl.² ........................................ B60K 37/00
[58] Field of Search .............. 180/90; 312/322, 323; 296/70

[56] References Cited
UNITED STATES PATENTS

| | | | |
|---|---|---|---|
| 1,382,907 | 6/1921 | Hatch | 312/323 |
| 2,049,080 | 7/1936 | Pickup | 312/322 X |
| 3,302,743 | 2/1967 | Mosquera | 180/90 |
| 3,446,546 | 5/1969 | D'Adamo | 312/323 |
| 3,452,835 | 7/1969 | Deli et al. | 180/90 |
| 3,557,897 | 1/1971 | Conner et al. | 180/90 |

Primary Examiner—Lloyd L. King
Assistant Examiner—Randolph A. Reese

[57] ABSTRACT

Two embodiments of instrument panel cover assemblies are disclosed and each includes a plurality of instruments mounted in a generally upright panel and an instrument panel cover which is constructed so as to be substantially linearly rearwardly shiftable from a normally stored position, wherein it rests upon a pair of strap-like supports which extend forwardly from an upper portion of the panel into the structure supporting the panel, to an intermediate position from which it is pivotable vertically downwardly to a closed position, wherein it covers the instruments.

17 Claims, 6 Drawing Figures

VEHICLE INSTRUMENT PANEL COVER ASSEMBLY

BACKGROUND OF THE INVENTION

The present invention relates to an instrument panel cover means for vehicles.

Industrial and farm motor vehicles are often left in areas where there is very little security for preventing unauthorized persons from tampering with the vehicles. These unauthorized persons often vandalize the vehicles by breaking the glass in the various instruments which are located in the instrument panel. In order to prevent this sort of vandalism, it is now common practice to provide such vehicles with instrument panel covers which may be locked in a position covering the instruments of the vehicle when the vehicle is to be left unattended for any length of time.

It has been found that many operators will not use an instrument panel cover unless the cover can be easily and conveniently stored when it is removed from its operative position covering the instrument panel.

SUMMARY OF THE INVENTION

According to the present invention, there is provided novel instrument panel cover means.

It is an object of the invention to provide an instrument panel cover which is of simple construction and which can be easily and conveniently moved between stored and operative positions. Specifically, it is an object of the invention to provide an instrument panel cover which is storable within the control console in a disposition extending generally perpendicular to the instrument panel, and which is movable generally linearly rearwardly from its stored position to an intermediate position from where it is swingable about the axis of pin means to an operative position covering the instrument panel.

A further object is to provide resilient biasing means for acting on the panel cover for retaining the cover in its stored position and for preventing it from vibrating.

Still another object is to provide an instrument panel cover, as described above, which is mounted such that the ignition switch key must be removed before the panel can be placed in its operative position. A related object of the invention is to provide the instrument panel cover with a key-operable lock having a locking element which is operable through means of the ignition key to secure the panel cover to the panel support structure. Still a further related object of the invention is to provide the panel cover with an apertured tab which is insertable into an aperture in the panel support, the locking element passing into the apertured tab such as to minimize the amount of bending to which the locking element would be subjected by anyone trying to force the cover from its operative position.

These and other objects will be apparent from the following description and the appended drawings.

DESCRIPTION OF THE PREFERRED EMBODIMENTS

Figure 1:
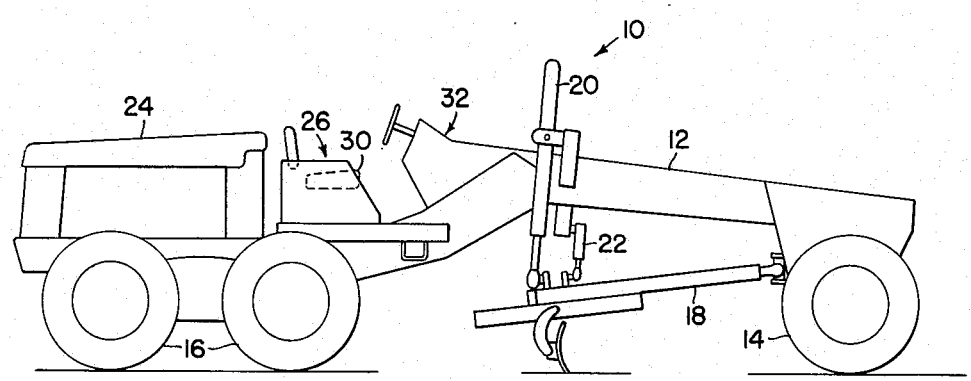
FIG. 1 is a side elevational view of a conventional industrial vehicle with which the present invention is particularly adapted for use.

Referring now to FIG. 1, therein is shown a motor grader indicated in its entirety by the reference numeral 10. It is to be understood that the motor grader 10 is merely representative of the type of vehicle with which the present invention is adapted to be used. The motor grader 10 is of conventional construction and includes a main frame 12 having an elevated forward portion which is supported upon a pair of front wheels 14 and a rearward horizontal portion which is supported upon two pairs of rear wheels 16. Positioned beneath the raised forward portion of the main frame 12 is a blade-carrying drawbar 18 having its forward end pivotally connected to the main frame in the vicinity of the front wheels 14 and having its rearward end supported by three hydraulic actuators, two of which are shown at 20 and 22. An internal-combustion engine 24 is mounted on the rear portion of the main frame 12. Just forwardly of the engine is an operator's station 26 including a platform 28 supporting a seat 30. Spaced forwardly of the seat so as to be within easy view and reach of an operator seated in the seat is a control console 32.

Figure 3:
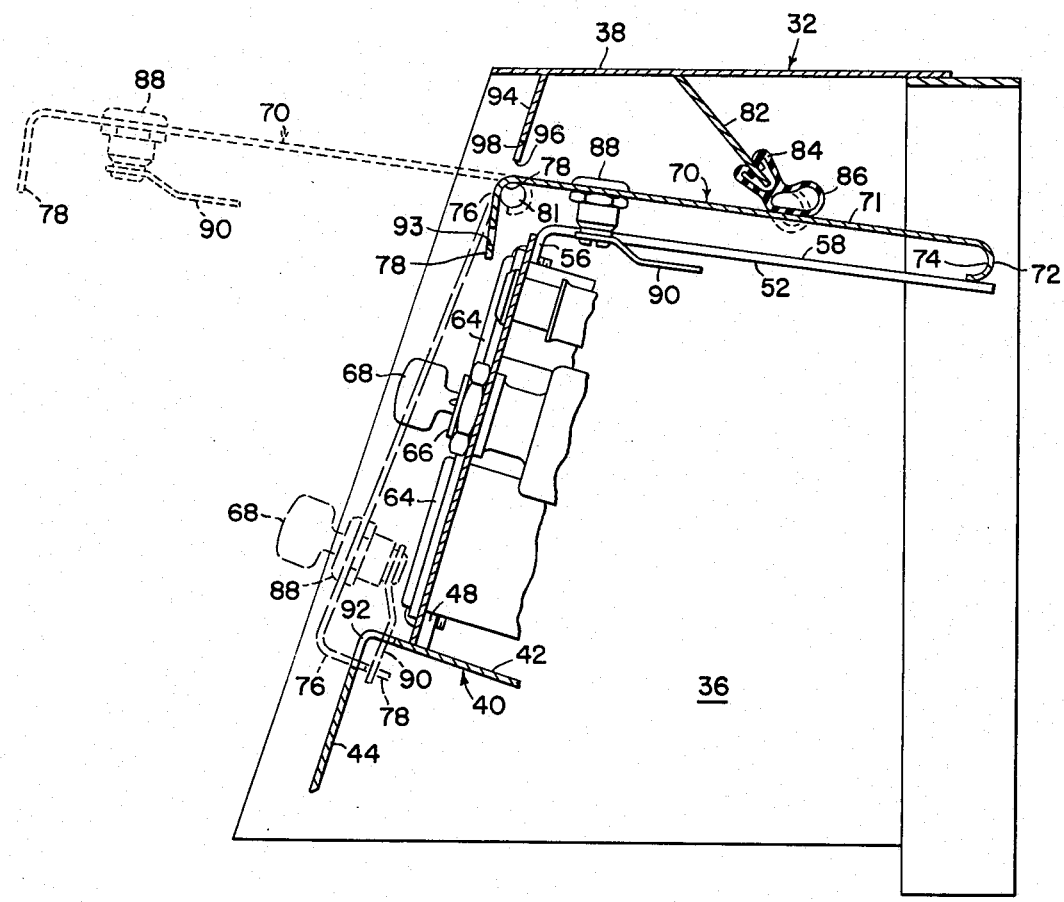
FIG. 3 is a vertical sectional view of the instrument panel assembly taken along the line 3—3 of FIG. 2.
Figure 2:
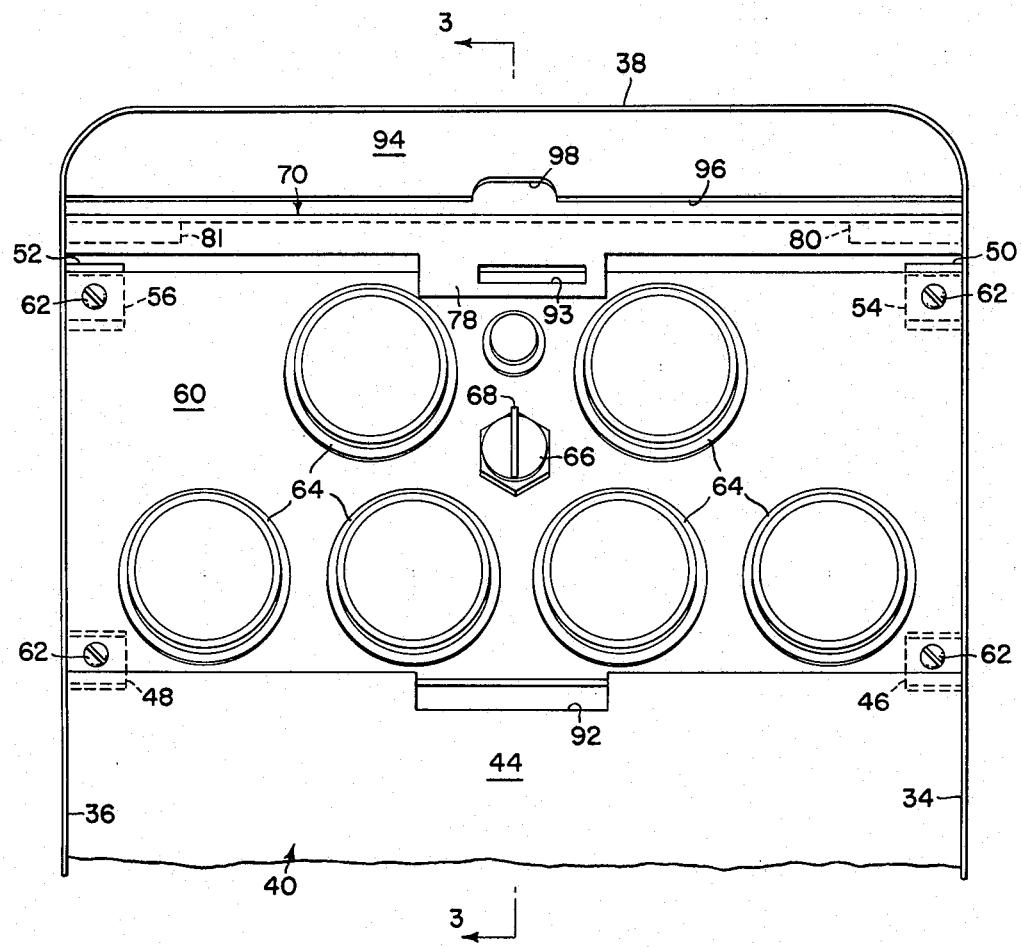
FIG. 2 is a front elevational view of a first instrument panel assembly embodiment.

Referring now to FIGS. 2 and 3, therein is shown a first embodiment of the control console 32, the latter comprising right and left fore-and-aft extending upright sidewalls 34 and 36 interconnected by a top wall 38 thus forming an inverted U-shaped support structure. An angular sheet metal member 40 extends between and is fixed to lower portions of the sidewalls 34 and 36 at the lower portion thereof and is disposed so as to have a forward leg or section 42 which inclines downwardly from its forward portion and a rearward leg or section 44 which extends downwardly at a right angle to the forward leg 42. Fixed in the corners respectively defined by the leg 42 of the member 40 and the right and left sidewalls 34 and 36 are right and left tabs 46 and 48, respectively. Spaced vertically above the sheet metal member 40 and respectively secured, as by weldments, to the insides of the right and left sidewalls 34 and 36 are right and left fore-and-aft extending strap-like supports 50 and 52, respectively, having downwardly angled rear end portions 54 and 56 forming tabs having rearward faces which are coplanar with corresponding rearward faces of the right and left tabs 46 and 48. The right and left strap-like supports 50 and 52 respectively include upper planar surfaces which lie in a common plane and are inclined downwardly from the rearward end portions of the members, only the upper surface of the support 50 being shown at 58.

The right and left tabs 46 and 48 and the rear end portions of the right and left strap-like supports 50 and 52 are positioned in a rectangular arrangement and a rectangular instrument panel 60 is secured to the outer faces of the tabs and strap-like supports through means of a plurality of screws 62. The instrument panel 60 includes a plurality of apertures in which are respectively supported the rearwardly facing portions of various instruments including a plurality of glass-covered gauges designated here by the reference numeral 64. The gauges may, for example, include a coolant temperature gauge, an engine oil pressure gauge, a transmission oil temperature gauge and a fuel gauge. The instruments also include an ignition switch 66 having an aperture in which is located an ignition key 68.

For the purpose of protecting the various instruments of the first console embodiment from being vandalized when the motor grader is left unattended, there is provided a first embodiment of an instrument panel cover assembly, the cover assembly including a substantially rectangular instrument panel cover 70, which in FIG. 2 is shown in solid lines in a stored position. As viewed in its stored position, the panel cover 70 includes a central planar portion 71, a downwardly and rearwardly curved forward end 72 defining a rearwardly opening semicylindrical receptacle or hook 74 and a downwardly extending rearward end 76 making a right angle with the central planar portion and defining a downwardly projecting tab 78 centrally between the opposite sides thereof. The forward end 72 rests on the upper surfaces of the right and left strap-like supports 50 and 52, respectively, and the panel cover 70 rests, adjacent its rearward end, on a pair of right and left horizontal transversely extending and aligned pins 80 and 81 respectively fixed to the inner sides of the right and left sidewalls 34 and 36 of the control console. Projecting downwardly and forwardly from the inner side of the top wall 38 of the control console is a transverse plate-like member 82 having a transverse lower edge spaced above the stored panel cover 70 and serving as a mounting for a transverse elastomeric member 84 having an upper portion bonded to the plate-like member 82 and having a hollow bottom portion 86 shown in an upwardly deflected downwardly biasing relationship to the panel cover 70. Centrally mounted in the panel cover 70 adjacent the rearward end thereof is a key-operable lock 88 having a rotatable latching element or finger 90 provided for cooperating with apertures 92 and 93 respectively located in the angular sheet metal member 40 and the tab 78 for locking the panel cover 70 in its operative position shown in broken lines in FIG. 3, the aperture 92 also receiving the tab 78 of the panel cover 70. As can best be seen in FIG. 3, only a small portion of the element 90 extends below the tab 78. Thus, it will be appreciated that the bending forces which can be exerted on the element 90 by one trying to force the locked cover from its closed position are minimized.

In order to ensure that the ignition key is removed by the operator, when the cover 70 is placed in its operative position, the inside of the instrument panel cover 70 and the ignition switch 68 are so spaced that there is insufficient room to accommodate the ignition key 68 thus requiring the latter to be removed before the panel cover can be placed in its operative position. Also, the key-operable lock 88 is preferably constructed so as to be operable through means of the ignition key 68 thus making it unnecessary for the operator to carry an extra key.

The space between the inner side of the top wall 38 of the control console and the transverse pins is closed through means of a transverse plate 94 which depends from the top wall 38 and has a lower edge 96 which is spaced slightly above the transverse pins 80 and 81. The plate 94 thus prevents the panel cover 70 from being removed from its operative position by moving the cover upwardly. The lower edge 96 of the plate 94 is notched as at 98 to permit the passage of the key-operable lock 88.

Briefly, the operation of the panel cover assembly is as follows. When the motor grader 10 is being operated, the instrument panel cover 70 will normally be in its stored position, as illustrated in solid lines in FIG. 2. When in this position, the elastomeric member 84 will bias the cover downwardly against the strap-like supports 50 and 52 and the pins 80 and 81 so as to hold the instrument panel cover 70 in place and to prevent the latter from vibrating. When the motor grader 10 is to be left unattended for any length of time, it may be secured by first removing the ignition key 68 and then by grabbing the rearward end of the cover 70 and pulling the latter rearwardly along the supports 50 and 52 until the transverse pins 80 and 81 become seated in the receptacle 74 and then by rotating the cover downwardly far enough to dispose the aperture 93 of the tab 78 through the aperture 92 in the member 40 and then by locking the cover in place by rotating the locking element 90 downwardly into the apertures 92 and 93 through means of the ignition key 68. The foregoing procedure is reversed in order to replace the cover 70 in its stored position, it being noted that the rounded end 72 of the cover has the advantage that it provides a smooth surface for contacting and elevating the hollow portion 86 of the elastomeric member 84 as the cover is thrust forwardly from the dashed-line position shown in FIG. 2.

Figure 4:
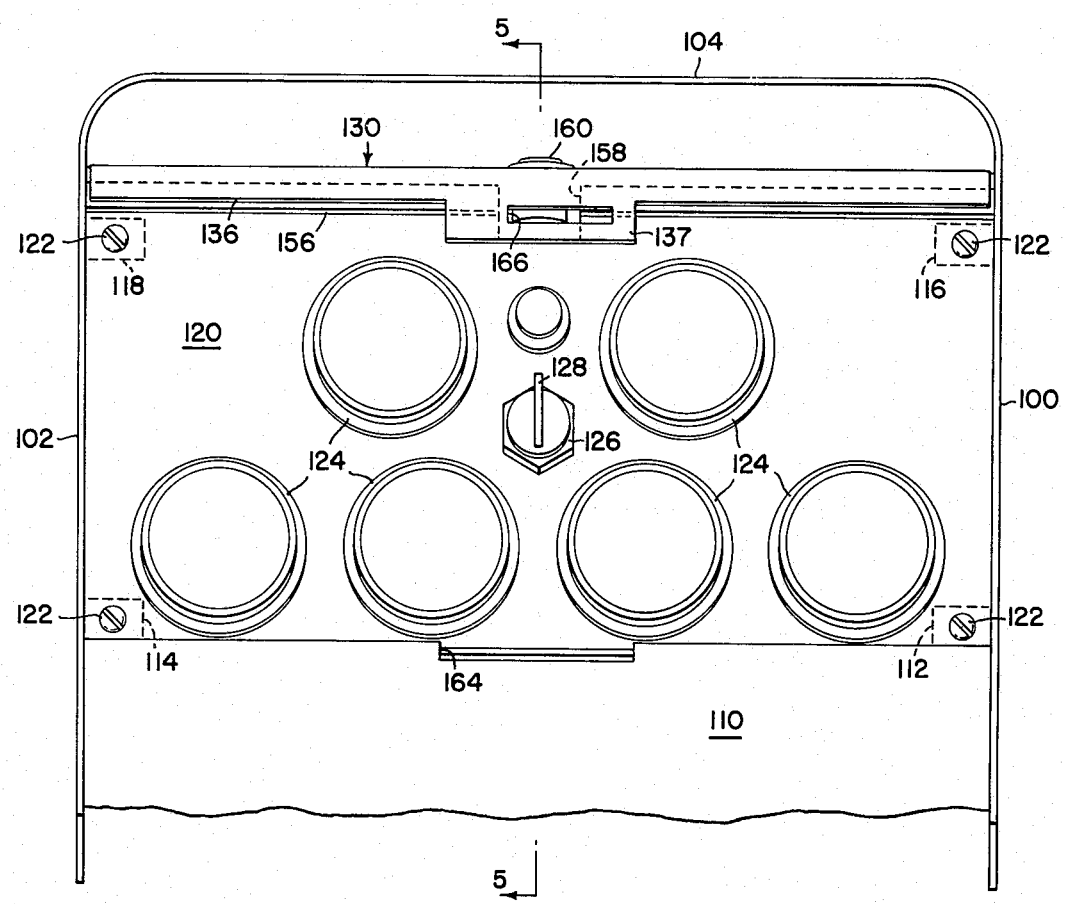
FIG. 4 is a front elevational view of a second instrument panel assembly embodiment.
Figure 6:
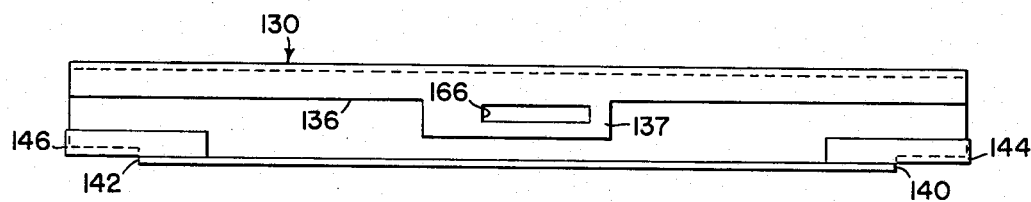
FIG. 6 is a front end view of the instrument panel cover shown in FIGS. 4 and 5 but with the lock removed.
Figure 5:
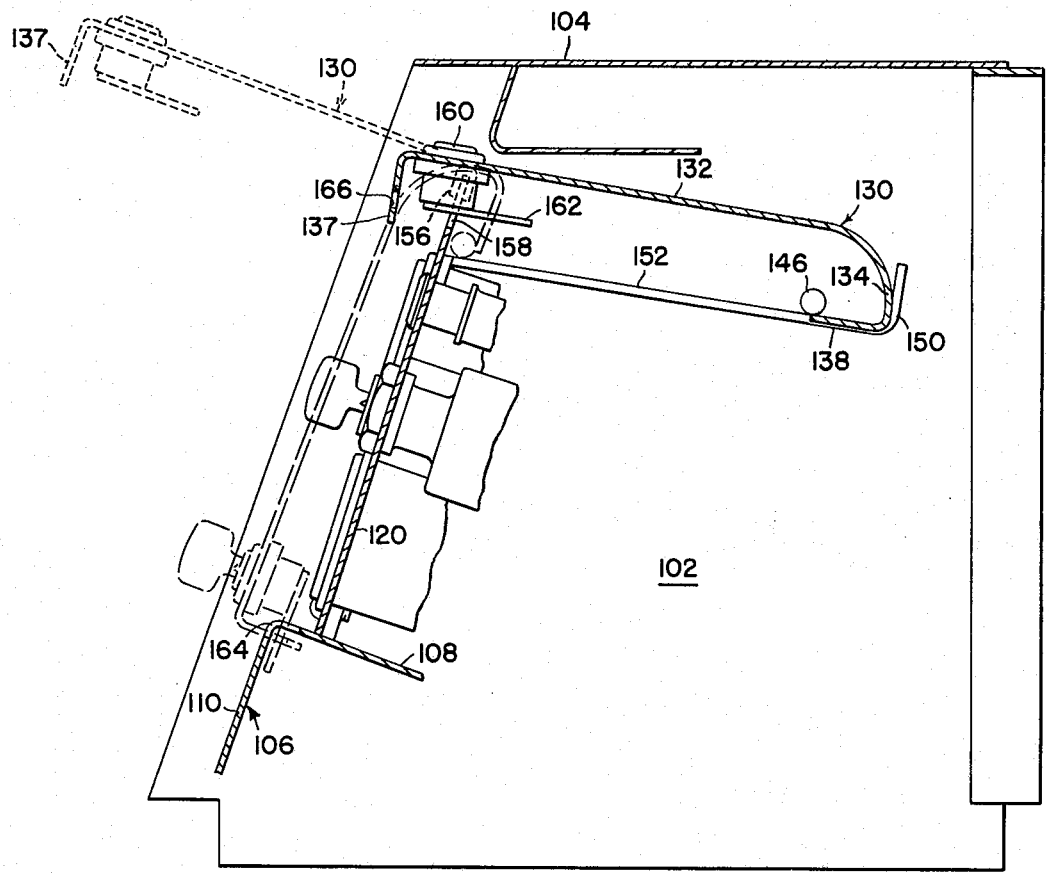
FIG. 5 is a vertical sectional view of the instrument panel assembly taken along the line 5—5 of FIG. 4.

Referring now to FIGS. 4–6, therein is shown a second embodiment of the control console 32. Being somewhat similar in construction to the first-described console, the console shown in these figures includes right and left fore-and-aft extending upright sidewalls 100 and 102 interconnected by a top wall 104 thus forming an inverted U-shaped support structure. An angular sheet metal member 106 extends between and is fixed to the right and left sidewalls at the respective lower portions thereof and is disposed so as to have a forward leg or section 108 which inclines downwardly from its forward portion and a rearward leg or section 110 which makes a right angle with the front leg 108. Fixed in the corners respectively defined by the upper surface of the leg 108 and the right and left sidewalls 100 and 102 are right and left lower tabs 112 and 114, respectively. Spaced upwardly and forwardly from the lower tabs are right and left upper tabs 116 and 118 which are fixed to the right and left sidewalls 100 and 102, respectively. The tabs are positioned in a rectangular arrangement and a rectangular instrument panel 120 is secured to the outer faces of the tabs through means of a plurality of screws 122. The instrument panel 120 includes a plurality of apertures in which are respectively supported the rearward facing portions of various instruments including a plurality of glass-covered gauges designated here by the reference numeral 124. Similar to the previously described gauges 64, the gauges may, for example, include a coolant temperature gauge, an engine oil pressure gauge, a transmission oil temperature gauge and a fuel gauge. The instruments also include an ignition switch 126 having an aperture in which is located an ignition key 128.

For the purpose of protecting the various instruments of the second console embodiment from being vandalized when the motor grader is left unattended, there is provided a second embodiment of an instrument panel cover assembly that includes a panel cover 130 shown in a solid-line stored position in FIG. 4. As viewed in its stored position, the panel cover 130 includes a central rectangular portion 132, a forward end portion 134 backturned beneath the rectangular center portion and a rearward end portion 136 which is angled downwardly substantially at a right angle to the rectangular center portion and defining a centrally located tab 137, having a function, described below. The backturned forward end portion 134 defines a lip 138 which extends parallel to the rectangular center portion 132 and, as can best be seen in FIG. 6, is notched at its right side as at 140 and at its left side as at 142. Fixed to the upper side of the lip 138 and extending across the notches 140 and 142 are horizontal, transversely extending right and left pins 144 and 146, respectively, the pins being axially aligned. Extending fore and aft and being fixed to the inner sides of the right and left sidewalls 100 and 102 of the control console are right and left strap-like supports, only the left one being shown at 150. The strap-like supports respectively pass through the right and left notches 140 and 142 in the panel cover 130 when the latter is in its stored position. The right and left pins 144 and 146 respectively engage planar upper surfaces respectively of the right and left strap-like supports, only the upper surface 152 of the support 150 being shown. The upper surfaces of the strap-like supports are coplanar and extend generally parallel to the rectangular center portion 132 of the panel cover 130 and terminate rearwardly at the forward side of the instrument panel 120 at a location spaced downwardly from the upper edge of the panel cover. Thus, the forward end of the panel cover 130 is supported on the strap-like supports. The rearward end of the panel is supported on the top edge of the instrument panel 120 on which there is located a molding 156 which is made of rubber or the like. Located centrally in the upper edge of the instrument panel 120 is a notch 158 which is dimensioned for receiving a key-operable lock 160 which is mounted centrally in the panel cover 130 adjacent the rear end thereof, the lock 160 including a latching element or finger 162. For the purpose of receiving the tab 137 of the rearward end portion 136 of the panel cover 130 and the latching element 162 when the panel cover is moved to its operative position shown in broken lines in FIG. 5, the angular member 106 is provided with a central opening 164. The tab 137 is also provided with a central opening 166 for receiving the latching element 162 when the latter is rotated into a latching position as shown in broken lines in FIG. 5.

Similar to the previously described cover 70, the inside of the instrument panel cover 130 and the ignition switch 126 are so spaced when the panel cover is in its operative position that there is insufficient room to accommodate the ignition key 128 thus requiring the latter to be removed before the panel cover may be placed in its operative position. Also, the key-operable lock 160 is preferably constructed so as to be operable through means of the ignition key 128. Like in the first-described panel cover assembly embodiment, an important feature of the lock is the fact that the latching element 162 passes through the notch 166 located in the tab 137 at such a location so as to leave only a short end portion thereof extending below the opening 166, the end portion being parallel to the inner side of the rear surface 110 of the angular member 106. Thus, any attempt to force the cover rearwardly after it is locked will result in mainly a shearing force being applied to the latching element 162 and such a shearing force would have to be quite large in order to cause failure of the latching element 162.

Briefly, the operation of the panel cover assembly embodiment shown in FIGS. 4–6 is as follows. When the motor grader 10 is being operated, the instrument panel cover 130 will normally be in its stored position, as illustrated in solid lines in FIG. 5. When in this position, the rectangular center portion 132 of the panel cover 130 is in engagement with the molding 156, the latter acting to frictionally resist rearward movement of the panel cover. When the motor grader 10 is to be left unattended for any length of time, it may be secured by first removing the ignition key 128 and then by grabbing the rearward end portion 136 of the panel cover 130 and pulling the latter rearwardly until the transverse pins 144 and 146 become engaged with the forward surface of the instrument panel 120. The cover 130 is then rotated downwardly to its closed position wherein the tab 137 of the rearward end portion 136 extends into the opening 164 in the angular member 106. The cover is then locked in place by rotating the latching element 162 into the opening 166 in the panel cover 130. The foregoing procedure is reversed in order to replace the panel cover 130 in its stored position.

Thus, it will be appreciated that the two panel assembly embodiments disclosed have the common features of being of simple construction and of including covers which may be easily and conveniently moved between stored and operative positions.

I claim:

1. In a vehicle of a type including a seat, an instrument panel support structure spaced forwardly of the seat and a generally upright instrument panel including upper, lower and opposite side edges and being spaced forwardly of the seat and supporting a plurality of instruments positioned so as to be in the line of sight of a forwardly facing operator seated in the seat, an instrument panel cover assembly, comprising: cover support means forming part of said panel support structure and having upwardly facing, substantially planar slide surface means extending forwardly from and generally perpendicular to said instrument panel adjacent one of said upper and lower edges thereof; an instrument panel cover having a central planar portion dimensioned for covering said instrument panel; said panel cover including first and second end portions at opposite sides of said central planar portion; said panel cover having a stored position wherein said first end portion rests upon said slide surface means at a forward location of the latter and said central panel portion extends generally parallel to said slide surface means; stop surface means being fixed to said panel support structure at a location, in the path of rearward movement of said first end portion of said panel cover along said slide surface means from said stored position, spaced a distance rearwardly from said forward location of said slide surface means at least as great as that between said forward location and the rear end of said slide surface means; said first end portion and said stop means being configured so as to cooperate to establish a horizontal pivot axis when the cover is in an intermediate position wherein said first end portion is in bearing engagement with said stop means, said cover being pivotable about said axis to an operative position wherein said central planar portion thereof extends rearwardly of and in covering relationship to said instrument panel; and releasable lock means for selectively releasably securing said panel cover to said support structure when the cover is in said operative position.

2. The vehicle defined in claim 1 wherein said stop means includes transverse, horizontal pin means being fixed to said panel support structure so as to define a pivot axis located rearwardly of and spaced vertically from one of said upper and lower edges of the panel; said first end portion of said panel cover, as viewed in its stored position, defining a rearwardly opening hook-like receptacle means adjacent the forward end thereof, the receptacle means extending to one side of the planar portion and having an arcuate seating surface positioned and shaped for the complementary reception of said pin means when the panel cover is moved rearwardly to said intermediate position, the pin means and receptacle means thus forming hinge means whereby said cover may be swung vertically, about said axis defined by the pin means, to the operative position of the cover.

3. The vehicle as defined in claim 2 wherein said horizontal pin means is positioned vertically above the upper edge of said instrument panel and said hook-like receptacle means being in sliding engagement with said slide surface means of said cover support means when the panel cover is in said stored position.

4. The vehicle as defined in claim 3 and further including a compressible biasing means connected to said support structure at a location positioning said biasing means above and in compressed engagement with said panel cover when the latter is in said stored position.

5. The vehicle as defined in claim 4 wherein said biasing means comprises an elastomeric member having a hollow lower end.

6. The vehicle as defined in claim 2 wherein one of said instruments is a key-operable ignition switch having a key receptacle; said operative position of the panel cover being spaced closer to said switch than the minimum distance required for permitting a key to remain in said key receptacle with the cover in said operative position; said releasable latch means including a key-operable lock carried by said panel cover and including a rotatable latching finger spaced forwardly from the cover, when the latter is closed, and extending generally parallel to the cover; and said panel support structure including a plate located in the path of rotation of said finger when the cover is in said operative position; and said plate containing an aperture for releasably receiving said finger when the latter has been rotated to a latching position.

7. The vehicle as defined in claim 1 wherein one of said instruments is a key-operable ignition switch having a key receptacle; said operative position of the panel cover being spaced closer to said switch than the minimum distance required for permitting a key to remain in said key receptacle with the cover in said operative position; said releasable latch means including a key-operable lock carried by said panel cover and including a rotatable latching finger spaced forwardly from the cover, when the latter is closed, and extending generally parallel to the cover; and said panel support structure including a plate located in the path of rotation of said finger when the cover is in said operative position; and said plate containing an aperture for releasably receiving said finger when the latter has been rotated to a latching position.

8. The vehicle as defined in claim 7 wherein said second end portion of said panel cover includes a tab positioned for insertion in said aperture in said plate when the panel cover is being moved to said operative position; and said tab being apertured for receiving said rotatable latching finger of said key-operable lock when the finger is in its latching position.

9. The vehicle as defined in claim 1 wherein said first end portion of said panel cover is turned back in general parallel, spaced relationship to said central planar portion and includes a horizontal transversely extending pivot pin means in bearing engagement with said slide surface means.

10. The vehicle defined in claim 9 wherein the rear end of said slide surface means terminates at said instrument panel; and said instrument panel forming said stop means.

11. The vehicle defined in claim 10 wherein said slide surface means is located adjacent to but below the upper edge of said instrument panel; and said cover being dimensioned such that said central planar portion thereof rests upon said upper edge when the cover is in its stored position.

12. The vehicle defined in claim 11 wherein a rubber-like molding forms a substantial portion of said upper edge.

13. The vehicle defined in claim 12 wherein said releasable lock means includes a key-operable lock mounted on the cover at a central location between the opposite transverse sides of said cover adjacent the rearward end thereof, and said upper edge of said instrument panel defining a notch for accommodating a portion of said lock when the cover is in said stored position.

14. An instrument panel and panel cover assembly, comprising: an instrument panel support structure including spaced, substantially upright sidewalls; an instrument panel extending between said sidewalls and being secured to said panel support structure; said instrument panel having spaced side edges respectively disposed at least in close proximity to said opposite sidewalls and having spaced transverse edges extending transversely to said opposite sidewalls; a plurality of instruments being mounted in said panel and having surfaces facing in a direction generally perpendicular to said panel; cylindrical pin means defining an axis extending transversely to said opposite sidewalls, the pin means being fixed to said panel support structure at a location spaced from one of said transverse edges in a direction away from said panel and spaced from said panel in the direction faced by said instruments; said panel support structure including guide surface means extending substantially perpendicular to said panel in a direction opposite to that faced by said instruments and said guide surface means including an end portion located adjacent to said one of said transverse edges; an instrument panel cover being dimensioned to cover said panel and including a substantially central planar portion having spaced side edges adapted to be placed in close proximity with said sidewalls; said panel cover having at least one end portion extending transversely to said sidewalls and being reversely curved to one side of said planar portion so as to define a hook means shaped complementary to said pin means for receiving the pin means when the panel cover is moved from a stored position, wherein said panel cover engages said pin means and said guide surface means, in the direction faced by said instruments, to thus form a hinge connection about which the panel cover is swingable to an operative position wherein the panel cover extends over and blocks access to said instruments; and releasable lock means for releasably fixing said panel cover to said panel structure when the panel cover is in said operative position.

15. The instrument panel and panel cover assembly defined in claim 14 and further including deflectable resilient means fixed to said panel support so as to be in the path of movement of said panel cover when the latter is moved from said operative to said stored position and being so constructed and arranged that said panel cover deflects the resilient means as the panel cover moves to said stored position, in such a manner that the resilient means biases said panel cover against said pin means and said guide means.

16. The vehicle as defined in claim 14 wherein said panel cover includes a second end portion located on the opposite side of said central portion from said one end portion; said second end portion defining a tab angled away from said central portion so as to extend generally parallel to said guide surface means when the panel cover is in said operative position; said panel support structure including a plate having an aperture located to receive said tab when the panel cover is in said operative position; said tab having an aperture therein; and said releasable lock means including a key-operable latching finger rotatably mounted on said panel cover in a location for movement into the respective apertures of said plate and said tab when the panel cover is in said operative position.

17. In a vehicle of a type including a seat, an instrument panel support structure spaced forwardly of the seat, a generally upright instrument panel connected to the panel support structure and including upper, lower and opposite side edges bounding a plurality of instruments supported thereby so as to be in the line of sight of a forwardly facing, seated operator, an instrument panel cover assembly comprising: an instrument panel cover having a central portion dimensioned for covering the instrument panel; connection means interposed between a first end portion of the panel cover and the panel support structure for hingedly supporting the panel cover for movement between an operative position, wherein the central portion thereof extends rearwardly of and in covering relationship to the instrument panel, and a second position wherein the central portion of the panel cover is displaced angularly away from the instrument panel; said panel cover having a second end portion disposed on a side opposite from said first end portion; a key-operable lock carried by said panel cover adjacent the second end portion thereof and including a rotatable latching finger spaced forwardly from the cover when the latter is in said operative position; said panel support structure including a plate located in the path of rotation of said finger when the cover is in said operative position; an aperature located in said plate for releasable receiving said finger when the latter has been rotated to a latching position; said second end portion of the panel cover including a tab positioned so as to be inserted in said aperture in said plate when the panel cover is in said operative position; and said tab being apertured for receiving said rotatable finger of said key-operable lock when the finger is in its latching position.

* * * * *